Oct. 2, 1934.                L. H. POMEROY                1,975,700
                      POWER TRANSMISSION MECHANISM
                           Filed May 24, 1932
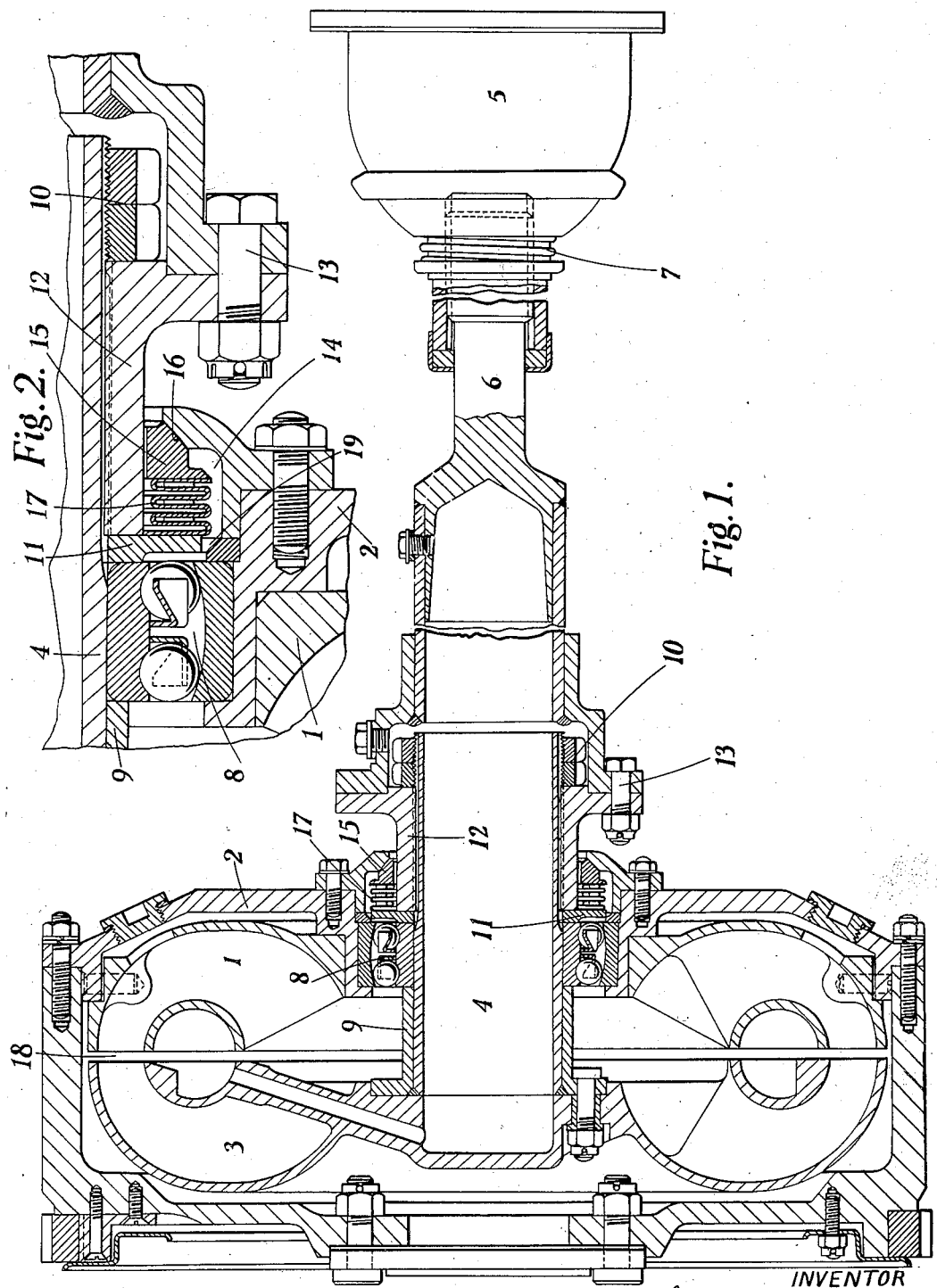

Patented Oct. 2, 1934

1,975,700

UNITED STATES PATENT OFFICE 1,975,700

POWER TRANSMISSION MECHANISM

Laurence Henry Pomeroy, Coventry, England, assignor to The Daimler Company Limited, Coventry, England, a British company Application May 24, 1932, Serial No. 613,328
In Great Britain July 10, 1931

4 Claims. (Cl. 60—54)

This invention relates to the transmission of power by hydraulic couplings of the Föttinger type.

It is usual to construct these couplings so that the clearance between the vanes on the driving and driven member is uniform around the circumference and, therefore, when they have to be connected, as is frequently the case, to the input shaft of a gear box, an intermediate shaft has to be used connected to the gear box and to the driven member of the coupling by universal joints.

These universal joints are a constant source of weakness, especially when the intermediate shaft is relatively long and, of course, they are very expensive to manufacture. It is now found that within certain limits, the clearance between the vanes on the driving and driven members of the coupling at different points around the circumference can differ without any material effect on the efficiency of the coupling and this realization has enabled an improved construction to be devised at a lower cost.

Thus, according to the invention, the driven member is mounted so that its axis is capable of an angular dis-alignment relatively to that of the driving member and the most convenient means of providing for this is to mount the driven member is a swivelling or self-aligning bearing housed in the casing of the coupling. When the coupling is to be connected to a gear box by an intermediate shaft, the latter can then be rigidly connected to the driven member instead of through a universal joint.

In order that the invention may be thoroughly understood and be more readily carried into effect, an example of construction in accordance therewith will now be described with reference to the accompanying drawing, in which:—

Figure 1 is a sectional elevation of a coupling of the Föttinger type connected to a gear box, and Figure 2 is an enlarged view of part of Figure 1.

The arrangement shown in the drawing is one which is suitable for a motor car transmission. The coupling is of a well-known type having a driving rotor 1 enclosed in and fixed to the casing 2 and a driven rotor 3 fixed to a short shaft 4 supported in a central aperture in the casing 2. The drive is transmitted to the gear box 5 through a shaft 6 connected to the gear box 5 by a flexible coupling 7.

The shaft 4 is provided with a self-aligning ball bearing 8, housed in a socket formed by the margin of the aperture in the casing 2 and is prevented from moving axially by means of the sleeve 9 and the lock nuts 10 which clamp together the inner race of the bearing 8, a washer 11 and a flanged sleeve 12 which is splined on to the shaft 4. As clearly seen in the drawing, the shaft 6 is rigidly fixed to the driven rotor 3 by the bolts 13. The outer race of the bearing 8 has a spherical bearing surface, which of course is concentric with the shaft 4, which can therefore be disaligned angularly in relation to the axis of the driving rotor.

A chamber 14 (see particularly Figure 2) is formed in the casing around the sleeve 12 and is bounded at one end by the washer 11 and at the other by a ring 15 mounted on a spherical seating 16 in the casing 2, which seating is concentric with the spherical surface of the bearing 8. This chamber 14 houses a metallic bellows packing 17 which is fixed by soldering both to the washer 11 and the ring 15 so as to form a tight joint, which prevents leakage of oil through the clearance which for manufacturing reasons is necessarily provided between the ring 15 and the sleeve 12.

From this construction it will be seen that the bellows 17 and the ring 15 rotate with the driven member 3 and that this assembly can oscillate about the bearing 8, while the spherical nature of the seating 16 effectively prevents leakage of oil between the ring 15 and the casing 2.

As these couplings usually use oil as the working fluid, lubrication of the bearing 8 is automatically provided for. It will be seen that the bearing 8 is immersed in oil and leakage is prevented by the washer 11 which leaves only a small space 19 through which the oil can flow past it and the bellows packing 17 which provides an effective seal.

The transmission unit described is a typical motor car unit, but the invention can, of course, be applied for the transmission of power for any other purpose and its constructional details are capable of modification without exceeding the scope of the invention. For example, the shaft 4 could be made in one piece with the rotor 3 or with the shaft 6. A plain spherical bearing could also be used in place of the ball bearing 8 and in this connection it is worthy of note that this bearing only has to deal with the differential rate of rotation between the two rotors. The universal joint 7 shown in the drawing is of a quite well-known type having two pins at right angles coupled together by a ring, but it is obvious that any other type of universal joint could be used.

I claim:—

1. A hydraulic coupling of the Föttinger type comprising rotatable driving and driven members, a shaft connected to and supporting the driven member and extending through an axial aperture of the driving member, and a bearing between said shaft and the margin of said aperture and constituting the sole bearing and aligning connection between said shaft and driving member, said bearing including means on one of said members for providing a spherical surface concentric with both said members, and means on the other said member for cooperating with said surface, so that the axes of said members may shift angularly with respect to one another.

2. A hydraulic coupling of the Föttinger type comprising rotatable driving and driven members, a shaft connected to and supporting the driven member and extending through an axial aperture of the driving member, a socket connected with and located within the driving member and having a spherical surface surrounding and concentric with said shaft, and bearing means carried by and concentric with said shaft engaging with and rotatable and rockable within said spherical surface so that the axes of said members may shift angularly with respect to one another.

3. A power transmission system comprising a hydraulic coupling of the Föttinger type having rotatable driving and driven members, an intermediate shaft connected to and supporting the driven member, a driven shaft, a universal joint coupling between said intermediate and driven shafts and axially spaced from said members, and a single swiveling bearing between said intermediate shaft and said driving member constituting the sole bearing and aligning connection between said intermediate shaft and driving member and located adjacent said members so that the axes of said members may shift angularly with respect to one another upon relative displacement of said driving member and said driven shaft.

4. A power transmission system comprising a hydraulic coupling of the Föttinger type having rotatable driving and driven members, an intermediate shaft connected to and supporting the driven member and extending through a central aperture in the driving member, a driven shaft, a universal joint coupling between said intermediate and driven shafts and located spaced from the margin of said aperture, and a bearing between said intermediate shaft and said driving member including a spherical surface located adjacent the margin of said aperture and concentric with both said members, and bearing means cooperative with said surface, said surface and cooperative means providing and constituting the sole bearing and aligning connection between said intermediate shaft and driving member and located adjacent said members so that the axes of said members may shift angularly with respect to one another upon relative displacement of said driving member and said driven shaft.

L. H. POMEROY.